United States Patent
Melzer et al.

(10) Patent No.: US 6,291,020 B1
(45) Date of Patent: Sep. 18, 2001

(54) COMPOSITION AND PROCESS FOR TREATING METAL SURFACES

(75) Inventors: Jeffrey I. Melzer, Lansdale; Richard J. Sujdak, Yardley, both of PA (US)

(73) Assignee: Betzdearborn Inc., Trevose, PA (US)

( * ) Notice: Subject to any disclaimer, the term of this patent is extended or adjusted under 35 U.S.C. 154(b) by 0 days.

(21) Appl. No.: 08/694,148

(22) Filed: Aug. 8, 1996

(51) Int. Cl.⁷ ........................................................ B05D 7/16
(52) U.S. Cl. .................. 427/387; 427/388.1; 427/388.4; 427/397.7; 427/397.8
(58) Field of Search ................................. 427/387, 388.1, 427/388.4, 397.7, 397.8

(56) References Cited

U.S. PATENT DOCUMENTS

| | | | |
|---|---|---|---|
| 3,989,550 | 11/1976 | Newhard | 148/6.16 |
| 4,328,142 * | 5/1982 | Hertel et al. | 523/417 |
| 4,503,907 | 3/1985 | Tanaka et al. | 165/133 |
| 4,588,025 | 5/1986 | Imai et al. | 165/133 |
| 4,828,616 | 5/1989 | Yamasoe | 106/14.13 |
| 4,973,359 | 11/1990 | Yamasoe | 106/14.13 |
| 5,096,958 | 3/1992 | Meguro et al. | 524/503 |
| 5,380,374 | 1/1995 | Tomlinson | 148/247 |
| 5,389,405 | 2/1995 | Purnell et al. | 427/387 |

* cited by examiner

*Primary Examiner*—Erma Cameron
(74) *Attorney, Agent, or Firm*—Greenblum & Bernstein, P.L.C.

(57) ABSTRACT

A method of forming a hydrophilic coating on a metal surface which includes contacting the metal surface with a substantially silane-free aqueous solution containing a cationic polymer and an alkaline aqueous silicate.

8 Claims, No Drawings

COMPOSITION AND PROCESS FOR TREATING METAL SURFACES

FIELD OF THE INVENTION

The present invention relates to the process of forming a hydrophilic coating on metal surfaces. Specifically, the present invention relates to a single non-chromium treatment that is equally effective on many different metal surfaces. Such metals include aluminum, steel, zinc coated steel and zinc-aluminum coated steel.

BACKGROUND OF THE INVENTION

The purposes of conversion coatings on metal surfaces are to provide corrosion resistance and improve the adhesion of the ultimate coating(s). The conversion coating improves the adhesion of final coating layers such as paints, inks, lacquers and plastics.

Traditionally, chromates have been utilized as conversion coating compounds. Chromates are known to exhibit acceptable performance on different types of metals or alloys, such as aluminum, steel, galvanized steel and zinc-aluminum coated steel. Chromate conversion coatings are typically administered by contacting the metal surface with an aqueous solution containing hexavalent or trivalent chromium ions, phosphate ions or fluoride ions. Serious concerns have been raised, however, regarding the pollution effects of the chromate or phosphate discharged into rivers or waterways by such processes. Due to the high solubility and the strongly oxidizing character of hexavalent chromium ions, conventional chromate conversion coating processes require extensive waste treatment procedures to control their discharge.

While many acceptable chromium-free conversion coatings have been developed, their utility is often limited to only one type of metal substrate. Many industrial operations, however, involve the sequential processing of different types of metals. Unless the undesirable chromium compounds are used, the industrial metal processor is forced to change the conversion coating bath for each different type of metal. This results in unacceptable downtime and higher processing costs.

During operation of an automotive evaporator, for example, moisture condenses on the aluminum fins. If the fin surface is hydrophobic, the condensed water, in the form of droplets, can form bridges between the fins, increasing resistance to air flow and decreasing the efficiency of the evaporator.

Conventional pretreatment of an evaporator to produce a hydrophilic surface involves the formation of a chromate conversion coating followed by a final silicate rinse. It is believed that the chromate coating forms a base for silicate, which imparts hydrophilicity to the surface. The performance of a pretreatment system may be determined by placing an evaporator core on a test stand and "hooking" into an air conditioning system. As the unit operates, water is condensed on the evaporator fins, and an air flow measurement across the fin surface is made. The change in air pressure across the wet fins (Wet Delta P- in inches of water), measured at various times during the test, is an indication of the performance of the hydrophilic coating. A smaller pressure change indicates a better coating.

While initial pressure drop (Wet Delta P) is low for a chromate/silicate process, the pressure drop increases steadily throughout the test. This change in performance over time suggests that the silicate coating is removed during the long term operation of the unit. Since an evaporator must be appropriately sized to adequately perform its function, this decrease in efficiency must be accounted for in the design of the evaporator.

It is desirable, therefore, to have a metal surface treatment that does not utilize a chromate conversion coating. Although non-chromate conversion coatings followed by a silicate final rinse are commercially available, it is also desirable to combine the process of forming a hydrophilic coating into one step, thus reducing water consumption and waste discharge. This is achieved by the composition and process of the present invention.

SUMMARY OF THE INVENTION

The present inventors have discovered a particular metal conversion coating which provides a hydrophilic coating on metal surfaces. The coating of the present invention is formed from a substantially silane-free aqueous solution containing an alkaline aqueous silicate and a cationic agent.

DETAILED DESCRIPTION OF THE PREFERRED EMBODIMENTS

The present inventors have discovered an effective method of pretreating metal surfaces by applying to the surface a substantially silane-free aqueous solution of a cationic agent and an alkaline aqueous silicate. Alternatively, all materials may be combined into a single solution and applied to the target metal surface in a single application.

The unique feature of the conversion coating composition of the present invention is that it provides an improved treatment for producing a hydrophilic coating on the surfaces of metals such as aluminum, steel, zinc coated steel (galvanized) and zinc-aluminum coated steel (Galvalume®).

The alkaline silicates used in this invention are derived from either ortho-or condensed silicates. Water soluble salts of the following inorganic anions, in particular the sodium, potassium and ammonium salts thereof, may be used in the practice of this invention. Such compounds are:

Metasilicate—$SiO_3^{2-}$

Orthosilicate—$SiO_4^{4-}$

Disilicate—$Si_2O_5^{2-}$

Mixed Silicates—$Na_2O.xSiO_2$ (where x=1–5)

Aluminosilicates—$Na_2O.xAl_2O_3.ySiO_2$ (where x+y= 3–5)

The preferred inorganic silicates are alkaline di- and metasilicates where the ratio of $SiO_2$ to $Na_2O$ is from about 2 to 1 to about 1 to 1.

The cationic agents of the present invention are cationic polymers which are of low to medium molecular weight, have a high charge density and may be crosslinked or linear condensation or addition polymers. Their number average molecular weight ranges between 1,000 and 600,000 and they are water soluble. The charge densities, as determined by the PVSK Colloid Titration Method (H. Terayama, Kayaku no Kenkya, Vol. 1, p. 75, 1948; H. Terayama, Kayaku no Kenkya, Vol. 4, p. 31, 1949; R. Senju, "Koroido Tekiteiho," Nandoko, Tokyo, 1969), are active in the range of about 1.5 to 12.0 meq/g active polymer.

Those polymers, which have demonstrated the desired performance characteristics, are:

| Polymer | Description |
|---|---|
| I | polydiallyl dimethyl ammonium chloride (available from CPS Chemical as Age Flex) |
| II | condensation product of dimethylamine plus epichlorohydrin plus ethylenediamine |
| III | condensation product of dimethylamine plus epichlorohydrin (U.S. Pat. No. 3,738,945) |
| IV | condensation product of diethylenetriamine plus adipic acid plus epichlorohydrin (BetzDearborn Inc.) |
| V | condensation product of hexamethylenediamine still bottoms plus ethylene dichloride plus epichlorohydrin (available from Monsanto as Santofloc F) |

The alkaline silicate and cationic polymer may be applied either as a single aqueous solution, or in sequence with or without an intervening rinse step, depending on the solubilities of the materials.

The treatment solution(s) may be applied to the metal surface to be treated by any conventional means such as spraying, wetting by dip squeegee, flow coating, immersion and the like. Immersion is generally preferred. The final solution of the present invention is preferably dried in place.

The following illustrative scheme summarizes the preferable sequence of application contemplated in this invention. In the scheme, "+" denotes that the agents are combined in solution.

alkaline silicate+cationic polymer

The components of the present invention may be added in amounts of at least 1 g/L of cationic polymer and at least 2 g/L of alkaline aqueous silicate, with treatment levels of from about 1–5 g/L cationic polymer and 2–10 g/L alkaline aqueous silicate preferred, and with about 3 g/L cationic polymer and about 7 g/L silicate being particularly preferred.

EXAMPLES

The present invention will now be further described with reference to a number of specific examples which are to be regarded solely as illustrative and not as restricting the scope of the present invention.

The Wet Delta P refers to running the evaporator in "simulated" service and measuring the change in air pressure across the fins at 100 hour intervals. A lower wet Delta P indicates a more hydrophilic surface and a more effective coating.

For all of the treatments studied, the final solutions that contacted the surface contained approximately 7.3 g/L $SiO_2$. The processing schemes were:

a) clean/rinse/rinse/Treatment A or Treatment B/oven dry or b) clean/rinse/rinse/chromate or Treatment C/rinse/silicate (only)/oven dry

TABLE 1

| Treatment | Wet Delta P (inches of water) | | | |
|---|---|---|---|---|
| | 0 hours | 200 hours | 400 hours | 600 hours |
| Chromate/Silicate | 0.080 | 0.260 | 0.350 | 0.370 |
| Treatment A | 0.140 | 0.290 | 0.310 | 0.320 |
| Treatment B | 0.090 | 0.350 | 0.390 | |
| Treatment C | 0.080 | 0.330 | 0.370 | |

Treatment A: Solution containing 7.4 g/L $SiO_2$, 3.3 g/L cationic polymer (Polymer IV)
Treatment B: Solution containing 7.5 g/L $SiO_2$, 12.5 g/L anionic polymer (copolymer of acrylic acid and acrylamide)
Treatment C: A commerically available non-chromate treatment (fluoacid + anionic polymer)

Although Treatment A coatings had a higher initial Delta P, the Delta P tends to level out as the test duration increases. This provides a distinct advantage over conventional treatments, such as the chromate/silicate coating, an anionic polymer/silicate coating and a non-chromate treatment/silicate coating, for which the wet Delta P continues to increase over time, indicating a decrease in the effectiveness of the coating and a decrease in the efficiency of the evaporator. Even at the longest exposure time in Table I, Treatment A's wet Delta P is lower than conventional treatments at shorter exposure times.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of forming a hydrophilic coating on a metal surface comprising contacting the metal surface with a substantially silane free and chromium free aqueous solution containing (a) at least 1 g/L of a cationic polymer having a charge density of from about 1.5 to 12.0 meg/g and a molecular weight between about 1,000 and 600,000, and (b) at least 2 g/L of an alkaline aqueous silicate.

2. The method as recited in claim 1 wherein said cationic polymer is selected from the group consisting of:
   polydiallyl dimethyl ammonium chloride,
   the condensation product of dimethylamine plus epichlorohydrin plus ethylenediamine,
   the condensation product of dimethylamine plus epichlorohydrin,
   the condensation product of diethylenetriamine plus adipic acid plus epichlorohydrin, and
   the condensation product of hexamethylene diamine plus ethylenedichloride plus epichlorohydrin.

3. The method as recited in claim 1 wherein the alkaline aqueous silicate is selected from the group consisting of metasilicate, orthosilicate, disilicate, aluminosilicate and $Na_2O.xSiO_2$ (where x=1–5).

4. The method as recited in claim 1 wherein the silicate comprises $SiO_2$ and $Na_2O$.

5. The method as recited in claim 1 wherein the metal is selected from the group consisting of aluminum, steel, galvanized steel and zinc-aluminum coated steel.

6. The method as recited in claim 1 wherein from about 1–5 g/L of cationic polymer is contacted with the metal surface.

7. The method as recited in claim 1 wherein from about 2–10 g/L of alkaline aqueous silicate is contacted with the metal surface.

8. The method as recited in claim 1 wherein from about 3 g/L of cationic polymer and about 7 g/L of alkaline aqueous silicate is contacted with the metal surface.

* * * * *